US011833890B2

(12) United States Patent
Lottes

(10) Patent No.: US 11,833,890 B2
(45) Date of Patent: Dec. 5, 2023

(54) COUPLING ROD FOR MANIPULATING AIR GUIDING LOUVERS WHICH ARE USED IN AN AIR VENT FOR VEHICLES, AIR VENT FOR A VEHICLE, AND AIR VENT SYSTEM

(71) Applicant: ILLINOIS TOOL WORKS INC., Glenview, IL (US)

(72) Inventor: Werner Lottes, Wunsiedel (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 138 days.

(21) Appl. No.: 16/985,596

(22) Filed: Aug. 5, 2020

(65) Prior Publication Data

US 2021/0039478 A1 Feb. 11, 2021

(30) Foreign Application Priority Data

Aug. 9, 2019 (DE) ...................... 20 2019 104 394.6

(51) Int. Cl.
*B60H 1/34* (2006.01)
(52) U.S. Cl.
CPC ... *B60H 1/3421* (2013.01); *B60H 2001/3478* (2013.01)
(58) Field of Classification Search
CPC .............. B60H 1/3421; B60H 1/00857; B60H 2001/3478; B60H 2001/3471; B60H 2001/3464; B60H 1/3414; B60H 1/24; F24F 13/08; F24F 13/1413; F24F 13/15; F24F 13/075; F24F 2013/1473; E05D 7/1077; E05D 2005/145
USPC ....................................................... 454/155
See application file for complete search history.

(56) References Cited

U.S. PATENT DOCUMENTS

| | | | | |
|---|---|---|---|---|
| 5,022,583 A | * | 6/1991 | Bruens ................. | G05D 23/023 236/49.5 |
| 5,272,889 A | * | 12/1993 | Harris ..................... | F24F 13/00 62/262 |
| 5,340,357 A | * | 8/1994 | Nagai ................. | B29C 45/0017 454/319 |
| 5,425,247 A | * | 6/1995 | Hatano ................... | F24F 13/15 62/262 |
| 5,586,935 A | * | 12/1996 | Kotoh ..................... | F16K 1/165 454/285 |
| 5,690,550 A | | 11/1997 | Mikowski | |
| 5,937,891 A | * | 8/1999 | Scoccia .............. | B60H 1/00678 251/303 |

(Continued)

FOREIGN PATENT DOCUMENTS

| | | |
|---|---|---|
| DE | 19528302 A1 | 2/1997 |
| DE | 29904248 | 5/1999 |

(Continued)

*Primary Examiner* — Allen R. B. Schult
*Assistant Examiner* — William C Weinert
(74) *Attorney, Agent, or Firm* — THOMPSON HINE LLP

(57) ABSTRACT

A coupling rod for manipulating air guiding louvers of a louver assembly which are used in an air vent for vehicles. The coupling rod has a multiplicity of bearing regions, each bearing region being configured to receive a bearing shaft (bearing journal, bearing pin, etc) which is assigned to one of the air guiding louvers in such a way that, in the case of a movement of the coupling rod in an adjusting direction relative to the air guiding louvers, the corresponding bearing shaft which is received in the bearing region is suitably guided.

9 Claims, 3 Drawing Sheets

(56) References Cited

U.S. PATENT DOCUMENTS

| | | | | |
|---|---|---|---|---|
| 6,250,012 | B1 * | 6/2001 | Ricci | E06B 7/086 |
| | | | | 49/90.1 |
| 7,500,329 | B2 * | 3/2009 | Downey | E06B 7/086 |
| | | | | 49/87.1 |
| 2014/0120826 | A1 | 5/2014 | Takai | |
| 2017/0057325 | A1 * | 3/2017 | Brinas | B60H 1/3421 |
| 2018/0099541 | A1 * | 4/2018 | Gareis | B60H 1/3421 |
| 2018/0229585 | A1 * | 8/2018 | Fidh | B60H 1/00871 |
| 2019/0039441 | A1 * | 2/2019 | Ito | B60H 1/3421 |

FOREIGN PATENT DOCUMENTS

| | | | | |
|---|---|---|---|---|
| DE | 20019038 | | 5/2001 | |
| DE | 102015209504 | | 11/2016 | |
| DE | 202018105986 | U1 | 1/2019 | |
| JP | 2003285640 | | 10/2003 | |
| JP | 2014111428 | | 6/2014 | |
| JP | 2017154526 | | 9/2017 | |
| NZ | 601457 | A * | 8/2013 | B01D 53/265 |

\* cited by examiner

COUPLING ROD FOR MANIPULATING AIR GUIDING LOUVERS WHICH ARE USED IN AN AIR VENT FOR VEHICLES, AIR VENT FOR A VEHICLE, AND AIR VENT SYSTEM

TECHNICAL FIELD

The present invention relates to a coupling rod for manipulating air guiding louvers of a louver assembly which are used in an air vent for vehicles. The invention also relates to a corresponding air vent having at least one such coupling rod.

BACKGROUND

In ventilation devices for vehicles, use is generally made of air vents or air outlet nozzles, which permit specific control of the emerging air stream. Such air vents are used for the supply in particular of fresh air into a vehicle interior.

The air stream flows via an inlet opening of the air vent into an air duct delimited by the housing wall of the air vent, through the latter and finally through the outlet opening of the air vent into the interior of a vehicle (for example passenger car or truck). The quantity of air flowing into the interior of the vehicle via the air vent per unit time can generally be controlled via an actuator adjustably provided in the air duct of the air vent, which actuator, for example, is configured as a throttling or closure flap. The actuator can also optionally be configured as an air guiding element or as part of an assembly of air guiding elements, in particular air guiding louvers.

In this connection, it is generally known to adjust the guiding elements, in particular air guiding louvers, in parallel via a connecting rod in each case, by which means the air guiding louvers can be moved from a closed position into an opening position, being pivoted continuously or in steps. The connecting rod, which is also designated as a "coupling rod", can be designed rectilinearly or curved in the longitudinal direction and/or cranked at bearing points. Known coupling rods generally consist of metal, since, as compared with coupling rods formed of plastic, coupling rods formed from metal have the advantage that they are very dimensionally stable even with a low thickness. The bearing points or bearing regions can be introduced into the metal coupling rod by drilling or punching. It is usual to introduce the bearing points or bearing regions in the grid of the spacings of the guiding louvers from one another or in the grid spacing of the bearing shafts (journals) assigned to the guiding louvers on which the bearing regions are placed.

Air vents of the type considered herein are used in particular to supply air into a vehicle. Within the air duct, air guiding louvers, which are used to deflect the air stream from the main flow direction, are pivotably mounted. By adjusting the guiding louvers, the air stream can be deflected in a desired direction. The air guiding louvers are coupled to one another—for example via a coupling rod—in terms of their movement and thus form the louver assembly. Furthermore, the air guiding louvers are also used to interrupt the air stream if necessary. For this purpose, the air guiding louvers can be pivoted in such a way that, in their respective end positions, by resting on one another, they reduce the free flow cross section of the air duct to zero and thus define a closed position. Air guiding louvers of this type, as so-called closing louvers, therefore serve to shut off the air guide duct as well and can in particular be provided as an alternative to a separately configured shut-off flap.

Because of manufacturing tolerances, in particularly in the air guiding louvers but also in the coupling elements for coupling the movement of the air guiding elements and also in the housing and bearing frames, louver assemblies of this type are possibly not able to interrupt the air stream completely. In particular during manufacture by injection molding, for example in plastic injection molding, it is possible for the aforementioned manufacturing tolerances to occur, which means that the air guiding louvers ideally resting on one another in their end positions in the closed position jam one another and, as a result, do not seal off adequately. In addition, in such coupling rods manufactured by injection molding, the louver assembly is frequently relatively complicated because of the larger tolerance ranges.

The document DE 10 2015 118 548 B4 describes an air vent, of which the air guiding louvers are forced into the closed position via a spring-configured gear wheel, which acts on one or more coupling rods adjustable via the gear wheel. In this way, the louvers are forced against the sealing surfaces in the housing synchronously as a whole by the energy stored in the spring element. This is intended to lead to compensation of manufacturing tolerances. However, even in such air vents, the closing force decreases with increasing distance from an activated louver. Relatively high operating forces are therefore necessary in order to achieve reliable closure of the air guiding louvers. In addition, here, too, during the adjustment of the air guiding louvers into the closed position, an unacceptably loud closing noise occurs. In addition, in this solution known from the prior art, the assembly of the coupling rod and of the air guiding louvers is relatively complicated.

Also known are air vents having air guiding louvers which, for different alignment of the air stream, can be moved into different angular positions relative to one another. For example, the air stream can thus be focused or fanned out, or improved air deflection in the extreme positions can be achieved. Such air vents are described, for example, in the document DE 10 130 951 A1 or in the document DE 10 2016 214 186 A1.

SUMMARY

The invention is based on the object of specifying a coupling rod for adjusting the guide louvers of a louver assembly from an open position into a closed position, wherein the coupling rod is intended to be usable as flexibly as possible. In particular, a greater tolerance range is to be achievable during the production process and the air guiding louver assembly. Furthermore, the air leakage rates permissible in accordance with customer specifications should be feasible in a manner which is as simple as possible but nevertheless effective.

This object is achieved by the subject matter of the independent claim 1, advantageous developments thereof being specified in the corresponding dependent claims.

Accordingly, the invention relates in particular to a coupling rod for manipulating air guiding louvers of a louver assembly which are used in an air vent for vehicles. The coupling rod has a multiplicity of bearing regions, each bearing region being configured to receive a bearing shaft (bearing journal, bearing pin, etc) which is assigned to one of the air guiding louvers in such a way that, in the case of a movement of the coupling rod in an adjusting direction relative to the air guiding louvers, the corresponding bearing shaft which is received in the bearing region is suitably guided.

In order to achieve a greater tolerance range during the production process and during the assembly of the guiding louvers, according to the invention provision is made in particular for at least one bearing region of the coupling rod to be configured in such a way that the bearing region configures a bearing with a received bearing shaft (bearing journal, bearing pin, etc) which bearing permits firstly a rotation of the bearing shaft relative to the bearing region and secondly—at least for a distance which is fixed or can be fixed in advance—a translational movement of the bearing shaft perpendicularly with respect to the rotational axis and relative to the bearing region.

Provision is in particular made for the at least one bearing region of the coupling rod to be configured to permit a translational movement of the bearing shaft perpendicularly with respect to the rotational axis and relative to the bearing region only if a minimum force which acts on the bearing shaft perpendicularly with respect to the rotational axis is exceeded. The minimum force is preferably fixed or can be fixed in advance and, in particular, is greater than a sliding or static friction force which occurs at the contact surfaces between the bearing region and the bearing shaft which is received by the bearing region.

According to preferred embodiments of the coupling rod according to the invention, provision is made for the at least one bearing region of the coupling rod to be configured to permit at least for a distance which is fixed or can be fixed in advance a translational movement of the bearing shaft perpendicularly with respect to the rotational axis specifically only in the displacement direction of the coupling rod relative to the bearing region. For example, this can be achieved by the at least one bearing region being configured as a region which projects from the coupling rod perpendicularly with respect to the displacement direction, this region projecting from the coupling rod perpendicularly with respect to the displacement direction in the direction of the displacement direction of the coupling rod being configured to be at least partly elastic and in particular resilient.

The distance by which a translational movement of the bearing shaft perpendicularly with respect to the rotational axis in the displacement direction of the coupling rod relative to the bearing region is permissible depends in particular on the desired tolerance ranges and the required or permissible air leakage rates. According to embodiments, provision is made in this connection for the at least one bearing region of the coupling rod to be configured in such a way that the bearing region configures a bearing with the received bearing shaft, which bearing permits a translational movement of the bearing shaft perpendicularly with respect to the rotational axis and relative to the bearing region in such a way that, in a closed position of the louver assembly, the individual air guiding louvers and the coupling rod are present in each case in a non-prestressed state.

Different embodiments are conceivable for forming the at least one bearing region of the coupling rod which firstly permits a rotation of the bearing shaft relative to the bearing region and secondly a translational movement of the bearing shaft perpendicularly with respect to the rotational axis and relative to the bearing region.

According to an embodiment which is particularly easy to implement but nevertheless effective, provision is made in this connection for the at least one bearing region of the coupling rod to be configured at least in regions as a bearing socket with a bearing opening for receiving the bearing shaft, the size and/or shape of the bearing opening being variable at least in regions in the case of an action of a minimum force which acts in the radial direction.

In this connection, it is conceivable, for example, for the bearing socket to have an elastic, in particular resilient, periphery region which, in particular, is configured as a type of fork tine.

To form the elastic periphery region, the bearing socket can have a constriction which extends radially from the bearing socket and the clear span of which is smaller than the diameter of the bearing shaft, the constriction being interrupted or opened on an end region which faces away from the bearing socket, in such a way that an elastically deformable fork tine which configures the bearing socket at least in regions is formed.

Of course, however, other embodiments for the at least one bearing region of the coupling rod are also suitable, such as a bearing socket which is partly configured as a spring element, such as in the shape of an interrupted elongated hole or in the shape of an open C.

According to implementations of the coupling rod according to the invention, at least one bearing region of the coupling rod is configured as a single-value radial bearing. Such a single-value radial bearing is occasionally also designated as a "pure radial bearing" or as a "radial-axial bearing". In this connection, it is important that the radial bearing has the rotation as a single degree of freedom.

As an alternative to this, it is, however also conceivable to provide a radial sliding bearing which is a radial bearing which additionally permits the translational movement in the direction of the rotational axis.

In order to simplify the assembly of the coupling rod, according to embodiments provision is preferably made for each bearing region of the coupling rod to have a bearing opening for receiving a bearing shaft of one of the air guiding louvers, each bearing opening preferably having a bevel for centering the bearing shafts during the introduction of the latter into the corresponding bearing opening.

In particular, the coupling rod can be configured as a plastic injection molded part. Here, in particular a one-component design would be conceivable, alternatively the design of the bearing regions from a softer plastic component being conceivable in order to suppress rattling noises of the bearing shafts in the bearing regions. In this case, a two-component injection molding process is recommended.

The solution according to the invention which has previously been described generally, including its preferred developments, offers a series of important advantages as compared with the solutions known from the prior art. In particular, the bearing regions of the coupling rod which serve as receptacles for the bearing shafts of the air guiding louvers can be constructed to be narrower or wider in size, in order thus to be able to exert an influence on the adjustment and assembly forces. Furthermore, by means of a suitable variation in the dimensioning of the bearing regions, an active influence can also be exerted on possibly occurring rattling and creaking noises.

Overall, the coupling rod according to the invention is a flexible, ductile coupling rod having variably configurable mountings (variable in shape and dimension) for receiving the bearing shafts of the air guiding louvers, in order to achieve a greater tolerance range during the production process, when setting the adjustment force and during the louver assembly, and at the same time to achieve the air leakage rates required by the customer or permitted. The air guiding louvers can reach their sealing closed position simultaneously but also in an undetermined order, as a result of manipulation of the coupling rod.

The coupling rod according to the invention thus offers high flexibility and adaptability to required tolerances, forces and customer specifications. In particular the coupling rod can preferably be installed or used bilaterally, therefore has the same configuration for a driver version and for a passenger version of an air vent, and therefore needs only a single tool (and not two) for producing the coupling rods for right-hand-side air vents and left-hand-side air vents.

The invention also relates to an air vent for a vehicle, the air vent having a housing with an inlet opening and an outlet opening, the housing delimiting an air duct for air which flows from the inlet opening to the outlet opening along a main flow axis. The air vent according to the invention also has a louver assembly which is arranged in the air duct with a plurality of air guiding louvers which are coupled in terms of movement and can be pivoted together with respect to the main flow direction, the air guiding louvers being configured to deflect the air stream from the main flow direction in an open position of the louver assembly and to interrupt the air stream in a closed position of the louver assembly.

For the movement-coupled manipulation of the air guiding louvers, at least one coupling rod of the aforementioned type according to the invention is used, each air guiding louver having a bearing shaft which is received in a bearing region of the coupling rod.

Advantageously, the air guiding louvers are configured as vertical louvers for the horizontal air deflection.

In addition, the invention relates to an air vent system having a first air vent of the aforementioned type, which is configured as a left-hand-side year vent, and having a second air vent, likewise of the aforementioned type, which is configured as a right-hand-side air vent. Provision is made for an identically configured coupling rod for manipulating the respective air guiding louvers to be used both in the first and in the second air vent, respectively.

BRIEF DESCRIPTION OF THE DRAWINGS

An exemplary embodiment of the solution according to the invention will be described in more detail below with reference to the appended drawings, in which.

DETAILED DESCRIPTION

Figure 1:
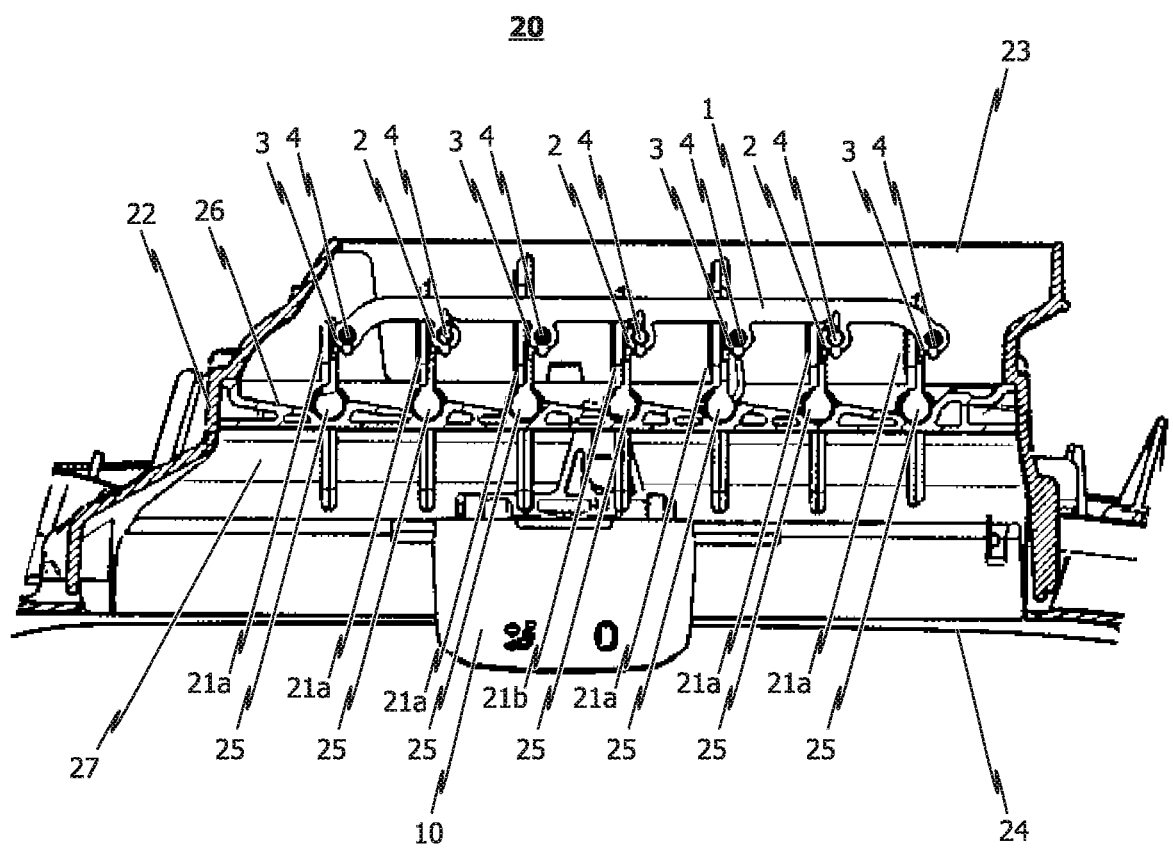
FIG. 1 shows, schematically and in a partially sectioned isometric view, an exemplary embodiment of the air vent according to the invention.
Figure 2:
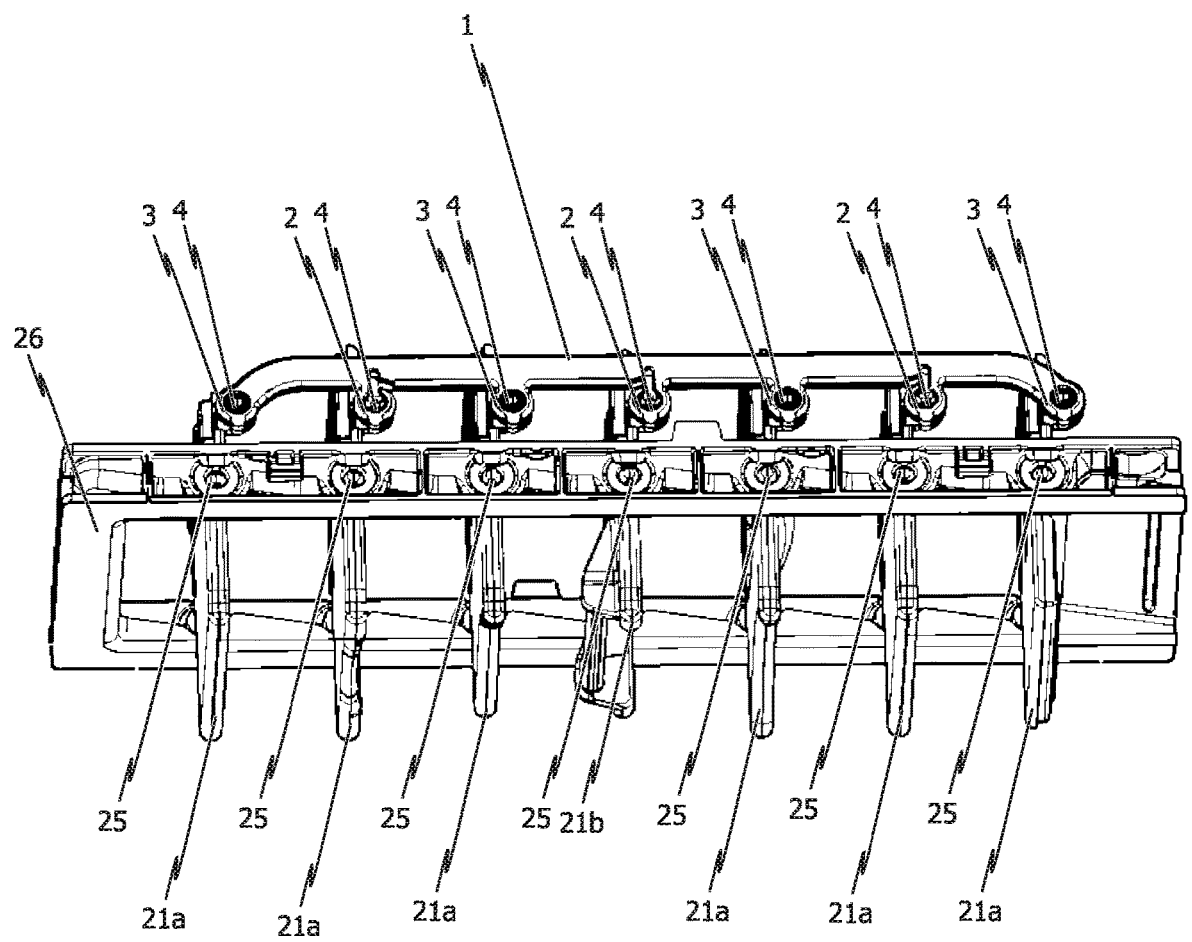
FIG. 2 shows, schematically and in an isometric view, a region of an exemplary embodiment of the air vent according to the invention with an embodiment of the coupling rod used for manipulating the air guiding louvers in the air vent.
Figure 3:
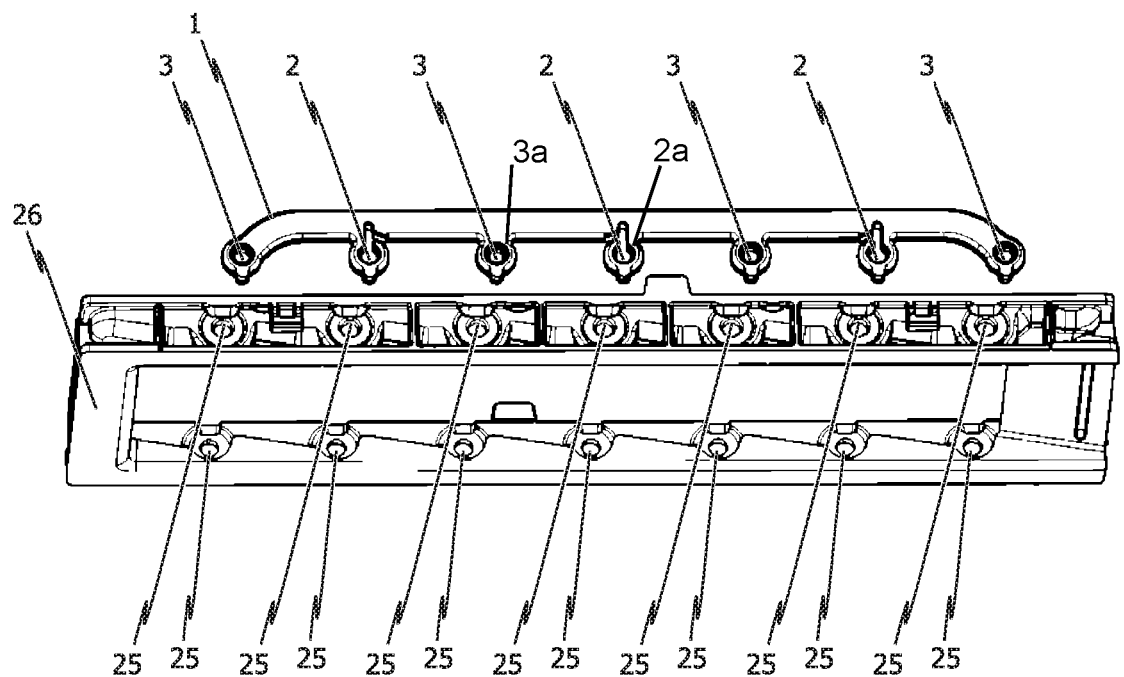
FIG. 3 shows, schematically and in an isometric view, the region shown in FIG. 2 of the exemplary embodiment of the air vent according to the invention without air guiding louvers.

FIG. 1 shows, in a partially sectioned view, an exemplary embodiment of the air vent 20 according to the invention. The latter has a housing 22 with an inlet opening 23 and an outlet opening 24, the housing 22 delimiting an air duct 27 which extends from the inlet opening 23 to the outlet opening 24. Mounted within the air duct 27 is a louver assembly, which can be seen better in particular in the illustration according to FIG. 2.

The louver assembly has a multiplicity of air guiding louvers 21a, 21b, which are coupled in terms of movement via a coupling rod 1 to a drive element 10. In detail, provision is made for the air guiding louvers 21a of the louver assembly to be coupled in terms of movement via a coupling rod 1 to a control louver 21b, for example arranged centrally in the louver assembly, wherein the control louver 21b can be adjusted via the drive element 10.

The air guiding louvers 21a, 21b are each received via bearing shafts 4 (pins) in receptacles of the coupling rod 1 configured as bearing regions 2, 3 and, via mountings 25, are pivotably mounted on a supporting frame 26 of the louver assembly. Via the drive element 10 already mentioned, the control louver 21b can be pivoted about its axis of rotation with respect to the air stream. Because of the coupling via the coupling rod 1, the other air guiding louvers 21a are also pivoted about their parallel axes of rotation, corresponding to the axis of rotation of the control louver 21b.

As a result of pivoting the control louver 21b, and therefore the remaining air guiding louvers 21a connected to the control louver 21a via the coupling rod 1, about their axes of rotation, the air stream flowing through the air duct 27 can be deflected from the main flow direction in two opposite directions. In the arrangement of the air vent 20 according to FIG. 1, the air stream can thus be deflected to the sides.

Furthermore, the louver assembly also serves to throttle or completely interrupt the air stream by adjusting the air guiding elements (control louver 21b and air guiding louver 21a). For this purpose, the louver assembly can be moved from an open position (cf. FIG. 1) into a closed position, not shown in the drawings.

The coupling rod 1 which, in the air vent 20 shown in the drawings, is used for manipulating the air guiding louvers 21a, 21b or coupling the movement of the air guiding louvers 21a 21b, has a multiplicity of bearing regions 2, 3. The bearing regions 2, 3 of the coupling rod 1 in the embodiment shown are configured, at least in regions, as a bearing socket 2a 3a having a bearing opening 5 for receiving a bearing shaft 4. Here, provision is made for each air guiding louver 21a, 21b of the louver assembly to have a correspondingly assigned bearing shaft 4 in the shape of a bearing pin.

For easier insertion during placement on the bearing shafts 4, the bearing regions 2, 3 configured as a bearing socket have appropriate bevels, which center the respective bearing shafts 4 during insertion.

In the coupling rod 1 shown in the drawings, a total of two different types of bearing rings 2, 3 are used. Firstly, use is made of bearing regions 3 which, together with an appropriately received bearing shaft 4, configure an in particular single-value radial bearing with the rotation as a single degree of freedom. In this connection, it is in particular conceivable if these bearings are designed as radial sliding bearings, i.e. as radial bearings which, in addition to the rotation, permit the translational movement of the bearing shaft 4 received by the bearing region 3 in the direction of the rotational axis.

Secondly, in the coupling rod 1 shown in the drawings, use is also made of bearing regions 2 which, with an appropriately received bearing shaft 4, configure a bearing which firstly permits a rotation of the bearing shaft 4 received by the bearing region 2 relative to the bearing region 2 and secondly—at least for a distance which is previously fixed or can be fixed—a translational movement of the bearing shaft 4 received by the bearing region 2 perpendicularly with respect to the rotational axis and relative to the bearing region 2. This type of bearing region 2 is shown in detail as an example in FIG. 4.

Figure 4:
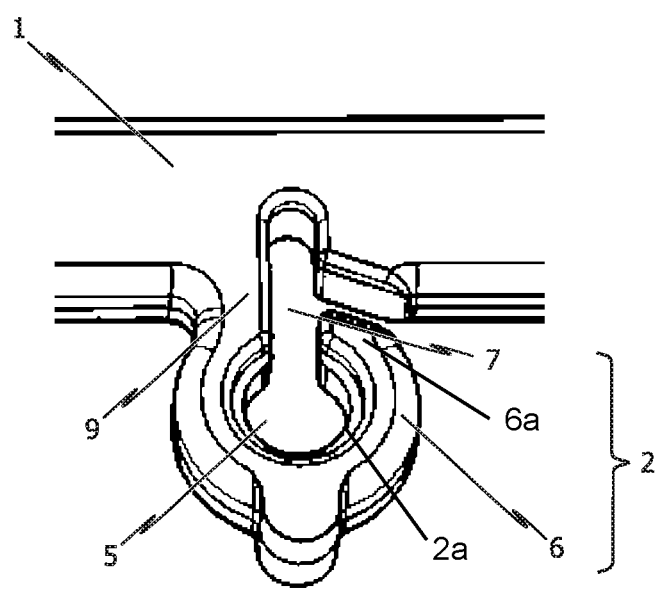
FIG. 4 shows a bearing region of the coupling rod shown in FIG. 2.

In detail, the bearing region 2 of the coupling rod 1 shown in FIG. 4 is configured, at least in regions, as a bearing socket having a bearing opening 5 for receiving a bearing shaft 4, the size and/or shape of the bearing opening 5 of the bearing region 2 being variable at least in regions in the case of an action of a minimal force which acts in the radial direction. For this purpose, provision is made for the bearing socket of the bearing region 2 to have an elastic, in particular resilient, periphery region 6 which, in the embodiment shown in FIG. 4, is formed as a type of "fork tine".

To configure the elastic periphery region 6, the bearing socket has a constriction 7 which extends radially from the bearing socket and the clear span of which is smaller than the diameter of the bearing shaft 4 to be received in the bearing socket. On an end region facing away from the bearing socket, the constriction 7 is interrupted or opened in such a way that an elastically deformable fork tine 6a forming the bearing socket at least in some regions is formed.

The elastic periphery region 6 of the bearing socket is configured in such a way that for a distance which is fixed, a translational movement of a bearing shaft 4 received in the bearing socket of the bearing region 2 perpendicularly with respect to the rotational axis is permitted in particular only in the planned displacement direction of the coupling rod 1 relative to the bearing region 2.

In this connection, provision is in particular made for each bearing region 2, 3 of the coupling rod 1 to be configured as a region (coupling arm 9) which projects from the coupling rod 1 perpendicularly with respect to the displacement direction.

By means of this configuration, it is ensured that a translational movement of the bearing shaft 4 perpendicularly with respect to the rotational axis and relative to the bearing region 2 is permitted only if a minimum force which acts on the bearing shaft 4 received in the bearing region 2 according to FIG. 4 perpendicularly with respect to the rotational axis is exceeded. The minimum force depends on the elastic spring constant of the elastic periphery region 6. This is in particular greater than a sliding or static friction force which occurs at the contact surface between the bearing region 2 and the bearing shaft 4 which is received by the bearing region 2.

As a result of the provision of specific bearing regions 2 which permit not only a rotation of a received bearing shaft 4 relative to the bearing region 2 but also a translational movement of the bearing shaft 4 perpendicularly with respect to the rotational axis and relative to the bearing region 2, overall a flexible and to a certain extent ductile coupling rod 1 is provided. In particular, this coupling rod 1 has variably configurable receptacles and mountings for the bearing shaft 4 of the air guiding louvers 21a, 21b. The receptacles can be constructed to be narrower or wider in size, so that an influence can therefore be exerted on the adjustment and assembly forces. Furthermore, by means of a suitable configuration (size and/or shape) of the bearing openings 5, rattling and creaking noises which may possibly occur can be reduced or eliminated.

Overall, a greater tolerance range can be achieved during the production process, when setting the adjustment force and also during the louver assembly.

The bearing regions 2 (receptacles) of the coupling rod 1 can partly be configured as spring elements (e.g. as an interrupted extended hole or with an open C shape) in order to permit the simplest possible assembly of the bearing shafts 4 of the air guiding louvers 21a, 21b, and in order to increase or to influence the flexibility and the tolerance range.

Although not illustrated in the drawings, the bearing regions 2 can be equipped with a soft component, in order to suppress possible creaking and rattling noises.

In order to influence the adjustment and closing forces, the coupling rod 1 can be configured to be rectilinear, curved or irregular, at least in regions.

In addition, the bearing regions 2 that project perpendicularly from the coupling rod 1 can be connected to the coupling rods 1 via different coupling arms 9. The bearing sockets of the bearing regions 2 can have an equal or else an irregular distance from one another.

The coupling rod 1 according to the invention does not prestress the air guiding louvers 21a, 21b of the louver assembly and is not subjected to any prestress, but achieves its high level of adaptability through its comprehensive flexible configuration. The flexible coupling rod 1 can be installed and assembled bilaterally.

As a result of the elastic configuration of the coupling rod 1, the bracing of the air guiding louvers 21a, 21b against each other can be achieved and thus any possible manufacturing tolerances of the air guiding louvers 21a, 21b and also of the coupling rod 1 and the entire dynamic train from the drive element 10 as far as the housing 22 can be compensated. Thus, reliable closure of the louver assembly without any leakage flows can be achieved.

In the case of a movement of the louver assembly into the closed position, the outer air guiding louvers 21a reach their respective end position first, because of an appropriately provided end stops, wherein, because of the elastic configuration of the coupling rod 1, the further air guiding louvers 21a, 21b can then reach their respective end position. As an alternative thereto, however, it is also conceivable that all the air guiding louvers 21a, 21b reach their end position simultaneously.

The invention is not restricted to the embodiment shown in the drawings; instead, all the features disclosed herein can be gathered from an overall view.

LIST OF DESIGNATIONS

1 Coupling rod
2 Bearing region
3 Bearing region
4 Bearing shaft
5 Bearing opening
6 Elastic periphery region
7 Constriction
9 Coupling arm
10 Drive element
20 Air vent
21a Air guiding louver
21b Air guiding louver (Control louver)
22 Housing
23 Inlet opening
24 Outlet opening
25 Mounting
26 Supporting frame
27 Air duct

What is claimed is:
1. An air vent for a vehicle, comprising:
a louver assembly arranged in an air duct and having a plurality of air guiding louvers which are coupled in terms of movement and are pivotable together with respect to a flow direction through the air duct, wherein the air guiding louvers are pivotably mounted via respective mountings to a supporting frame;
a coupling rod for manipulating the air guiding louvers, the coupling rod having a multiplicity of bearing regions, each bearing region being configured to receive a bearing shaft which is assigned to one of the air guiding louvers, in such a way that, in the case of a movement of the coupling rod in an adjusting direction relative to the air guiding louvers, the corresponding bearing shaft which is received in the bearing region is guided, at least one bearing region of the coupling rod being configured in such a way that the bearing region forms a bearing with the received bearing shaft, which bearing permits a rotation of the bearing shaft relative to the bearing region about a rotational axis;
wherein the at least one bearing region of the coupling rod is configured as a bearing socket with a bearing opening for receiving the bearing shaft, wherein the bearing socket is configured such that a size and/or shape of the bearing opening is variable at least in regions upon an action of at least a minimum force of the bearing shaft in a radial direction against the bearing socket, wherein the bearing socket engages the bearing shaft such that any translational movement of the bearing shaft relative to the bearing region, and perpendicularly with respect to the rotational axis, occurs only if the minimum force is exceeded so as to vary the size and/or shape of the bearing opening, wherein the bearing socket includes a periphery region that extends from the coupling rod, around the bearing opening and forms a free end adjacent to a constriction that extends from the bearing opening toward the coupling rod such that the bearing socket is closed on a side that (i) is opposite both the constriction and the coupling rod and (ii) faces the mountings.

2. The air vent as claimed in claim 1, the minimum force being fixed, and being greater than a sliding or static friction force which occurs at the contact surfaces between the bearing region and the bearing shaft which is received by the bearing region.

3. The air vent as claimed in claim 1, the at least one bearing region being configured as a region which projects from the coupling rod perpendicularly with respect to a displacement direction of the coupling rod.

4. The air vent as claimed in claim 1, at least one bearing region of the coupling rod being configured as a single-value radial bearing.

5. The air vent as claimed in claim 1, the coupling rod being configured as a plastic injection molded part.

6. The air vent as claimed in claim 1, the air guiding louvers being configured as vertical louvers for horizontal air deflection.

7. An air vent system having a first air vent as claimed in claim 1 which is configured as a left-hand-side air vent, and having a second air vent as claimed in claim 1 which is configured as a right-hand-side air vent.

8. An air vent for a vehicle, comprising:
a louver assembly arranged in an air duct and having a plurality of air guiding louvers which are coupled in terms of movement and are pivotable together with respect to a flow direction through the air duct, wherein the air guiding louvers are pivotably mounted via respective mountings to a supporting frame;
a coupling rod for manipulating the air guiding louvers, the coupling rod having a multiplicity of bearing regions, each bearing region being configured to receive a bearing shaft which is assigned to one of the air guiding louvers, in such a way that, in the case of a movement of the coupling rod in an adjusting direction relative to the air guiding louvers, the corresponding bearing shaft which is received in the bearing region is guided, at least one bearing region of the coupling rod being configured in such a way that the bearing region forms a bearing with a received bearing shaft, which bearing permits firstly a rotation of the bearing shaft relative to the bearing region about a rotational axis;
wherein the at least one bearing region of the coupling rod is configured as a bearing socket with a bearing opening for receiving the bearing shaft, wherein the bearing socket is configured such that a size and/or shape of the bearing opening is variable at least in regions upon an action of at least a minimum force of the bearing shaft in a radial direction against the bearing socket,
wherein the bearing socket includes a periphery region that is closed on a first side of the bearing opening that is opposite the coupling rod and faces the mountings, and a constriction extends from a second side of the bearing opening toward the coupling rod such that the periphery region defines an elastically deformable fork tine facing toward the coupling rod.

9. An air vent for a vehicle, comprising:
a louver assembly arranged in an air duct and having a plurality of air guiding louvers which are coupled in terms of movement and are pivotable together with respect to a flow direction through the air duct, wherein the air guiding louvers are pivotably mounted via respective mountings to a supporting frame;
a coupling rod for manipulating air guiding louvers of a louver assembly which are used in an air vent for vehicles, the coupling rod having a multiplicity of bearing regions, each bearing region being configured to receive a bearing shaft which is assigned to one of the air guiding louvers, in such a way that, in the case of a movement of the coupling rod in an adjusting direction relative to the air guiding louvers, the corresponding bearing shaft which is received in the bearing region is guided, at least one bearing region of the coupling rod being configured in such a way that the bearing region forms a bearing with a received bearing shaft, which bearing permits firstly a rotation of the bearing shaft relative to the bearing region about a rotational axis and secondly a translational movement of the bearing shaft perpendicularly with respect to the rotational axis and relative to the bearing region;
wherein the at least one bearing region of the coupling rod is configured at least in regions as a bearing socket with a bearing opening for receiving the bearing shaft, wherein the bearing socket is configured such that a size and/or shape of the bearing opening is variable at least in regions, wherein the bearing socket includes a periphery region that extends from the coupling rod, around the bearing opening and forms a free end adjacent to a constriction that extends from the bearing opening toward the coupling rod, such that the periphery region surrounds the bearing socket on a side of the bearing socket that is opposite the coupling rod and toward the mountings.

* * * * *